UNITED STATES PATENT OFFICE.

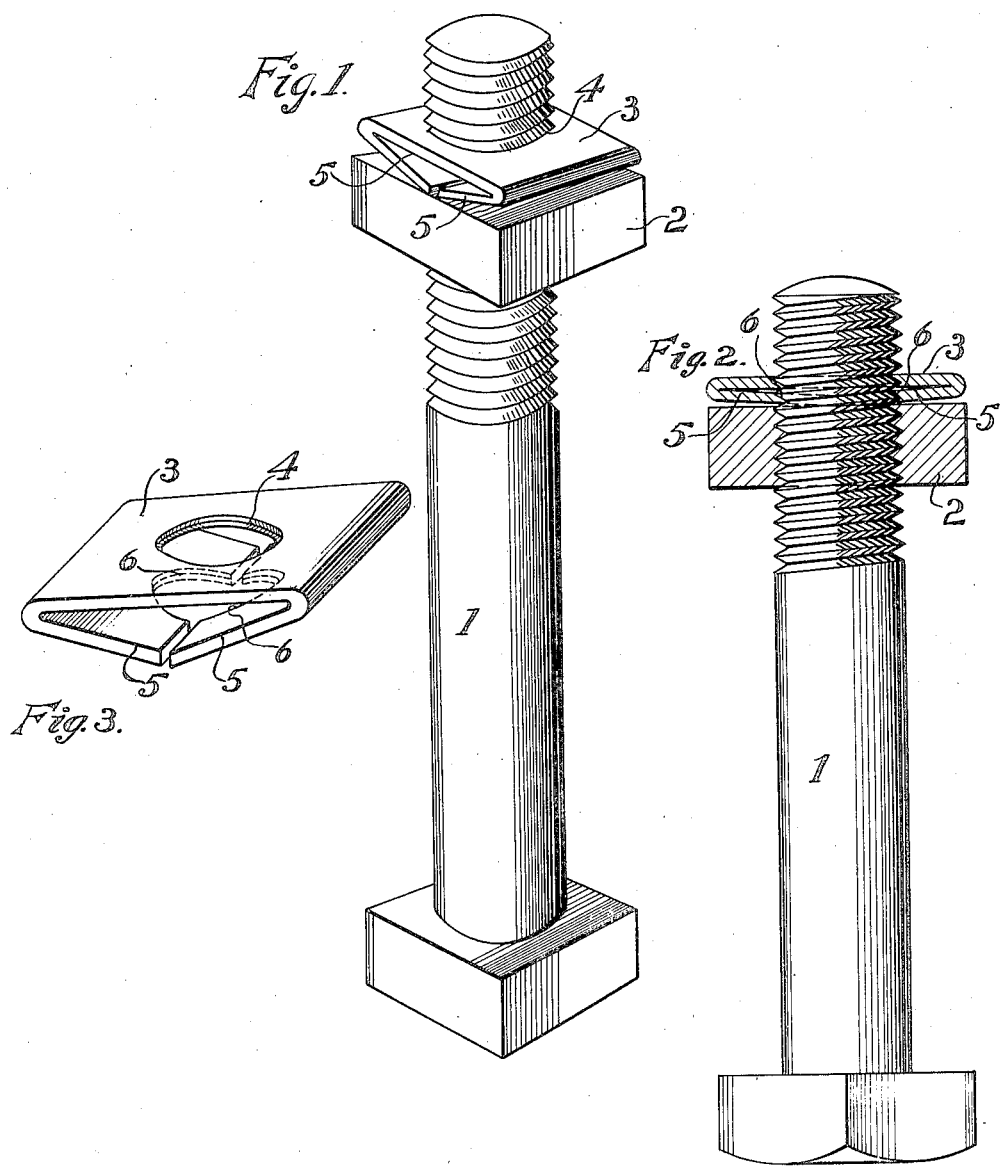

FREDERICK W. WOLF, OF CHICAGO, ILLINOIS.

NUT-LOCK.

1,102,840. Specification of Letters Patent. Patented July 7, 1914.

Application filed December 22, 1911, Serial No. 667,393. Renewed April 17, 1914. Serial No. 832,635.

*To all whom it may concern:*

Be it known that I, FREDERICK W. WOLF, a citien of the United States, and a resident of the city of Chicago, county of Cook, and State of Illinois, have invented certain new and useful Improvements in Nut-Locks, of which the following is a specification.

My invention relates to improvements in nut locks, and has for its object the production of a nut lock which will be of improved construction and efficient in operation.

Other objects will appear hereinafter.

With these objects in view, my invention consists in the combinations and arrangements of parts hereinafter described and claimed.

My invention will be best understood by reference to the accompanying drawing forming a part of this specification, and in which—

Figure 1 is a perspective view of a bolt and a nut threaded thereon to which is applied a nut lock embodying my invention, Fig. 2 is a side elevation of the bolt, the nut and nut lock being shown in section, and Fig. 3 is a perspective view of the nut lock detached.

Referring now to the drawing, 1 designates an ordinary bolt, one end of which is screw-threaded. Arranged upon said end of said bolt is a nut 2, also of conventional construction.

The nut lock in which the invention is embodied comprises a plate 3 which is preferably of rectangular form, corresponding in outline with the peripheral form of the nut in conjunction with which the same is used, said plate being comparatively thin, as shown, the same being formed of a suitable resilient metal, such as sheet steel. Formed centrally in the plate 3 is a screw-threaded opening 4 adapted for the reception of the threaded end of bolt 1, the threads in said opening being adapted to engage with those of said bolt, as clearly shown in Fig. 2.

Provided at opposite edges of the plate 3 are integral inwardly turned flanges 5 disposed in an inclined position, as shown, relative to the axis of the bolt. The inner edges of the flanges 5 are provided with semi-circular recesses 6 which afford clearance for the bolt, said recesses being adapted, when the flanges 5 are in normal position, to snugly embrace the opposite sides of the bolt. Said recesses are screw-threaded, as shown in Fig. 2, for engagement with the threads of the bolt, and so that when the plate 3 is threaded upon the bolt said flanges will simultaneously engage the threads of the bolt and will travel in engagement therewith in the same manner as the threads of said plate.

In using the nut lock the same is threaded upon the bolt after the nut has been arranged thereon in the position in which it is desired to lock the same. Said nut lock is threaded upon the bolt until the inner ends of the flanges 5 thereof engage against the outer side of the nut. Upon this engagement of the flanges with the nut, continued rotation of the plate 3 will serve to force the inner ends of said flanges into clamping engagement with the sides of the bolt, the threads of said flanges and of said plate being also forced into clamping engagement with the threads of the bolt, since continued rotation of the plate 3, after the flanges 5 have contacted with the nut, results in a strain upon said flanges and plate which causes the threads thereof to press against the threads of the bolt longitudinally of the axis of the latter to effect a secure fastening of the device upon the bolt and hence of the nut engaged thereby.

The device is extremely simple in construction, hence may be manufactured at a low cost, and further, the device may be readily and quickly arranged upon a bolt and as readily detached when desired.

While I have illustrated and described the preferred form of construction for carrying my invention into effect, this is capable of variation and modification without departing from the spirit of my invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. In a nut lock, the combination of a bolt and a nut threaded thereon; a resilient plate threaded upon said bolt and positioned adjacent said nut; and inclined inwardly turned opposing flanges on said plate for engagement with said nut for forcing the inner ends of said flanges into engagement with the opposite sides of said bolt, the engaging edges of said flanges being recessed to accommodate said bolt, the recesses being threaded to engage with the threads of said bolt, substantially as described.

2. In a nut lock, the combination of a bolt and a nut threaded thereon; a resilient plate threaded upon said bolt and positioned adjacent said nut; and inclined inwardly turned flanges at opposite edges of said plate, the inner ends of said flanges being adapted to engage said nut and be forced thereby into clamping engagement with the opposite sides of said bolt, the engaging edges of said flanges being provided with semi-circular recesses to snugly fit the opposite sides of the bolt, said recesses being provided with a screw threads for engagement with the threads of the bolt, substantially as described.

In testimony whereof I have signed my name to this specification in the presence of two subscribing witnesses.

FREDERICK W. WOLF.

Witnesses:
JOSHUA R. H. POTTS,
HELEN F. LILLIS.